United States Patent [19]

Yeagley

[11] 4,263,135

[45] Apr. 21, 1981

[54] CONTINUOUS AGITATION RAPID OXIDATION METHOD

[76] Inventor: Henry L. Yeagley, 133 Wilson St., Carlisle, Pa. 17013

[21] Appl. No.: 22,386

[22] Filed: Mar. 21, 1979

Related U.S. Application Data

[62] Division of Ser. No. 940,233, Sep. 7, 1978.

[51] Int. Cl.³ .............................................. C02F 3/02
[52] U.S. Cl. .................................. 210/612; 210/219; 210/629; 4/DIG. 12
[58] Field of Search .................. 210/14, 12, 96.1, 219; 4/111.2, 111.3, 111.6, DIG. 12

[56] References Cited

U.S. PATENT DOCUMENTS

| | | | |
|---|---|---|---|
| 3,666,103 | 5/1972 | Green | 210/14 X |
| 3,745,113 | 7/1973 | Fuchs | 210/14 X |
| 3,859,672 | 1/1975 | Modig | 4/111 |
| 3,865,721 | 2/1975 | Kaelin | 210/14 X |
| 3,959,829 | 1/1976 | Nordgren | 4/131 |
| 4,009,100 | 2/1977 | Hess et al. | 210/14 |
| 4,096,592 | 6/1978 | Clark | 4/DIG. 12 |
| 4,174,371 | 11/1979 | Bell et al. | 4/DIG. 12 |

OTHER PUBLICATIONS

"Humus-Toilet", brochure.

*Primary Examiner*—Thomas G. Wyse
*Attorney, Agent, or Firm*—Sughrue, Rothwell, Mion, Zinn and Macpeak

[57] ABSTRACT

The disclosed invention is a continuous bioconverter or dry closet and method capable of aerobically and bacteriologically converting human and other organic wastes to principally carbon dioxide and water vapor. The closet comprises a collecting vessel containing a medium suitable for supporting aerobic decomposition. In accordance with the invention, the decomposition is a substantially total conversion of organic wastes to gases. In a preferred embodiment in the closet are two parallel shafts, each supporting a rotationally mounted pair of opposing auger-type blades (see FIGS. 1, 2 and 3) which provide a most efficient stirring action, resulting in a complete and continuous aeration (oxidation) of the aerobic bacteria in the chemically reactive organic mixture. Also disclosed are modifications of the basic design wherein (a) an electric motor rotates the augers and is mounted within the collecting vessel; (b) an aerator is placed in the bottom of the collecting vessel; and (c) a vapor condenser is made a part of the exhaust system, all of which yield novel advantages discussed in the specification. In the method, wastes are introduced to the medium and continuously agitated and supplied with oxygen from the time of their introduction and for the duration of the bioconversion reaction.

3 Claims, 3 Drawing Figures

CONTINUOUS AGITATION RAPID OXIDATION METHOD

This is a division of application Ser. No. 940,233, filed Sept. 7, 1978.

In September 1977, at least half of our country was in the throes of a critical shortage of a natural resource many of us took for granted—water. That shortage opened many eyes to the fact that, if our population continues to grow at its present rate, in the not too far future, there may not be enough clean water to meet our daily needs. One way in which an individual's daily water requirement can be drastically reduced is to replace the conventional, and albeit popular, flush toilet with a dry or biodegrading toilet. Indeed, the flush toilet is the third most serious polluter and destroyer of our world's enviornment. Its menace is exceeded only by the pesticides of agriculture and the poisonous wastes of industry. While, to many, this may sound like a step back in time to the old outhouse, it does not have to be so distasteful or inconvenient.

I have discovered an improved dry closet which is so efficient in aerobic decomposition that it can be used in today's bathroom (or, for that matter, any room in the house since it is independent of conventional plumbing) without the accompaniment of unpleasant odors, and can be used for months without removing matter from the collecting vessel and with little or no resulting increase in the net weight of the matter in the collecting vessel. In fact, in some cases, even a net decrease is observed. During any 24-hour period, all of the liquid and solid human and food wastes deposited in the closet are converted into carbon dioxide and water such that, on a day-to-day basis, the weight of the bioconversion mix will remain almost constant. (Throughout this specification, the term "biconverting mix" describes the mixture of wastes and dispersing medium in the collecting vessel.)

I have also discovered a most efficient method for bioconverting wastes wherein the wastes are continually agitated and supplied with oxygen from the time they are introduced to the closet and for the duration of the bioconversion reaction.

U.S. Pat. No. 3,859,672 to Modig discloses a dry closet of the same general type as the present invention. Modig's closet comprises a collecting vessel having at least a partially perforated bottom. The vessel contains a bed of material suitable for biologically decomposing the waste matter and wherein the wastes are mixed with the bed as they are introduced to the vessel. According to Modig, the wastes are mixed with the bed only for a short time when they are introduced to the bed, and, for the most part, this is the only mixing which occurs. I have found that an extremely rapid oxidation is assured by continuously mixing the wastes from the time they are introduced to the vessel and throughout the biodegradation reaction. Accordingly, the present invention embodies several important improvements over the Modig dry closet.

SUMMARY OF THE INVENTION

First, in accordance with the present invention, human or other organic wastes are continually mixed with the dispersing medium by one or more means for rotationally and translationally moving the bioconverting mix in the collecting vessel. One such means being sets of parallel opposing auger-type blades. By rotationally and translationally moving the mix, I secure an improved mixing, action and optimum aeration of the bioconverting mass. Furthermore, the mixing which is conducted in the invention is carried on for the duration of the decomposition reaction until the substantially complete elimination of the organic wastes from the mixture.

In another embodiment of this invention, the motor which powers the mixers may be mounted inside the collecting vessel. As a result of this design, the heat and radiant energy generated by operating the motor is used to heat the biconverting mass, resulting in an additional energy savings.

In a further embodiment, I improve aeration by location an aerator at the bottom of the collecting vessel and pumping air through the matter in the collecting vessel.

In still a further embodiment of this invention, I conserve the heat carried from the bioconverter in the generated gases and evaporated water by passing the exhaust gases through a cooling and condensing system.

These and other embodiments of this invention will become more clear upon consideration of the following drawings.

DETAILED DESCRIPTION OF THE INVENTION

A most basic and fundamental requirement for successful operation of a biconverter, especially a bioconverter used in the home, is an ever-abundant supply of oxygen to the wastes at the optimum temperature and time for aerobic decomposition. To the extent this condition is fulfilled, the conversion reaction is more rapid and unpleasant odors are eliminated. When an abundant supply of oxygen is available to the wastes, contact between molecules of wastes, oxygen and aerobic bacteria is maximized, and the chief decomposition products materials are odorless carbon dioxide and water. On the other hand, if this condition is not fulfilled, anaerobic decomposition and unpleasant odors occur.

Typically, liquid (urine), solid and food wastes will be introduced to the bioconverter at one time. This, however, makes rapid bioconversion difficult because good contact between air (oxygen), wastes and bacteria is not possible when the mix is too wet. The percentage of moisture in the bioconveting mix should be 40-60% for optimum speed of reaction. If too much water is present in the wastes, the excess water interferes with the contact between wastes, oxygen and bacteria, but adequate water must be present for the bacteria to function.

In accordance with the present invention, contact between air and wastes is maximized by continuously and thoroughly agitating the wastes and dispersing medium and supplying air (oxygen) to them from the time the wastes and deposited in the collecting vessel to the time the decomposition reaction is completed. Using this technique, the waste mixture has an opportunity to reduce the moisture content (i.e., to a 40-60% water content level) and oxygen is still being supplied to wastes at the optimum moisture level for bioconversion.

In contrast to conventional techniques where the wastes are agitated only temporarily and oxygen is inadequately supplied and the water content of the wastes is not optimal for bioconversion, in the present invention, by continuing to agitate and supply oxygen to the wastes long after their introduction to the collecting vessel, a plentiful supply of oxygen is available at the most opportune time for degradation.

Figure 1:
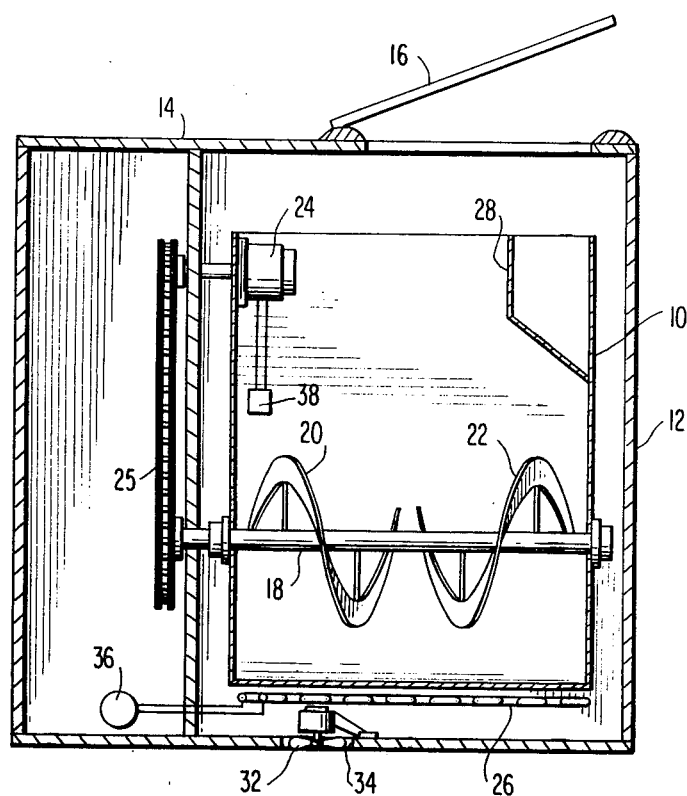
FIG. 1 is a side view of the closet with motor mounted in the collecting vessel (the dispersing medium is not shown).

In the drawings, like parts are identified by the same reference numeral. A home unit is shown in FIG. 1, where the collecting vessel is approximately U-shaped and designated 10. The collecting vessel may be formed of any suitable non-corrosive, easily cleaned material. Stainless-steel is preferred. The size of the vessel should be adjusted for the number of people using the dry closet. A two-person unit has dimensions approximately 18" long, 20" wide and 18" deep, with two radii of the curved bottom being 5". The vessel is housed in a cabinet 12 having an upper surface 14 with an elevateable lid 16. The cabinet may be constructed of any material; aesthetically, a material is selected which gives the unit an attractive appearance. In the three units I have constructed, the cabinet is made of a ply board having a white formica or brown stain surface. Commercially, molded plastic may be preferred.

Not shown in FIG. 1 for the convenience of the illustration is the bed of dispersing medium. The dispersing medium may be any material suitable for supporting aerobic decomposition. Such media are well known in the art. Its basic function is to act as a carrier for the wastes, whereby the wastes are evenly distributed and intimately contacted with the oxygen in the air as they are stirred and mixed. Peat moss is a preferred medium, but the medium may not need to be biologically decomposable itself.

Figure 2:
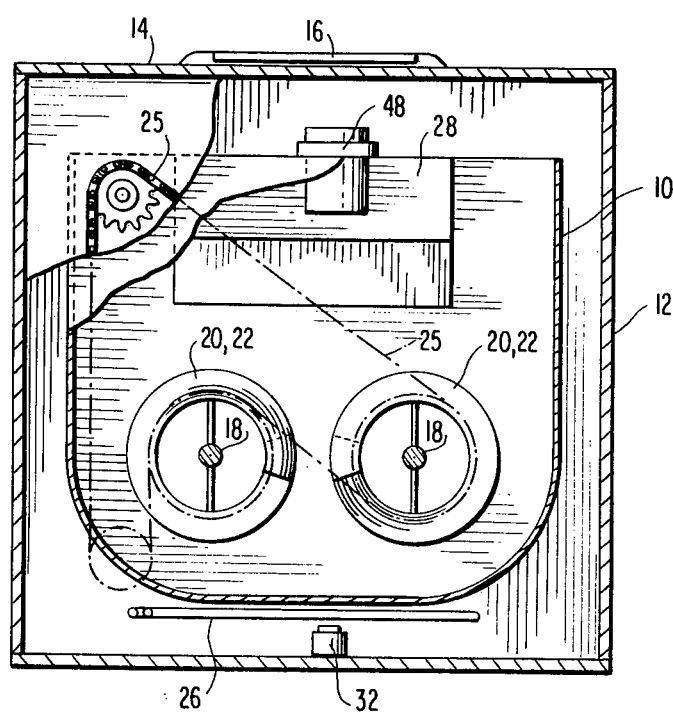
FIG. 2 is a front view of the closet.

In the embodiment shown in FIG. 1, the rotational and translational mixing is accomplished by two pairs of parallel opposing augers. Horizontal shafts 18 are rotationally journaled to the side walls of the collecting vessel 10 and each carries two augers 20 and 22. The auger-type stirrers are arranged to oppose one another such that they rotate in the same direction on the shaft, they move the bioconverting matter from the left and right walls of the collecting vessel in FIG. 1 to the center. The horizontal shafts are powered by electric motor 24 via a chain drive 25 and rotate in opposite directions such that the mix is moved upward between them as shown in FIG. 2. Naturally, any means can be used to transmit power from the motor to the horizontal shafts, and a chain drive is shown merely for purposes of illustration. The motors I use operate at about 5 r.p.m., and the augers rotate at about 2 r.p.m.

Oxygen from the atmosphere is supplied to the collecting vessel by means of circulating fan 32 located in vent 34. As the fan rotates, a continual supply of oxygen is furnished as the air and decomposition products are drawn from the collecting vessel. The exhaust air and decomposition products are conveniently conducted to the outdoors by means of a vent pipe. In the case of a modern bathroom installation, removal of the flush toilet leaves an open 4-inch soil pipe flush with the floor which forms a natural air vent to the roof. Thus, to substitute my bioconverter for the flush toilet, it is only necessary to position the vent and circulating fan with respect to the soil pipe. In a bedroom installation or an installation where a soil pipe is unavailable, a short 4-inch flexible plastic tube will serve to carry the exhaust vapors through a window arrangement or through a side wall of the house.

Unlike bioconverters presently on the market, it is recommended that the Continuous Agitation Rapid Oxidation Bioconverter operates at a uniform temperature of about 90° F. throughout its entire mixing mass. This is maintained exothermally when wastes of sufficient amount are still present, otherwise the temperature is maintained by electrical energy when new wastes are introduced. Conventionally, the mass is heated with a heat generating means, such as a heating coil, tape, or wire, on the underside of the collecting vessel, as shown at 26. By mounting the motor within the collecting vessel, the heating requirement from these conventional means may be reduced by the amount of heat generated by the motor inside of the vessel. This process is found to eliminate pathogens by bacterial action at the operating 90° F. temperature rather than due to elevated temperatures as in conventional systems now on the market. While temperature of 90° F. is recommended, higher or slightly lower temperatures can be used without departing from the teachings herein. In order that the decomposition reaction takes place, the art has found it necessary to elevate the temperature of the mixture in the collecting vessel. I have found when using my converter that it is not necessary to raise the temperature as high as in the prior art but temperatures of about 90° F. are ideal for conversion and also set-up conditions sufficient to kill the pathogens.

The heating and mixing requirements vary depending on the use the closet receives. When the decomposition reaction is in its most active stage, the heat generated by the exothermic decomposition reaction is sufficient to maintain the temperature requirement. At this stage, it is unnecessary to supply heat to the vessel. On the other hand, when the reaction is less active, the temperature must be maintained for efficient decomposition. To this end, heat generating means 26 is provided with a thermostatic switch 36 which activates the means when the temperature in the vessel is too low and cuts the means out when additional heat is not required.

Likewise, the length of time the chemically reactive mass must be mixed and agitated by the mixers varies with the amount of use—longer times being required for more use and shorter times being required for less. While continuous agitation is necessary for a rapid reaction and good oxygen (air) waste contact, cost and energy considerations as well as undesirable dust production dictate that the device not be run once the decomposition reaction is over. I have observed that the humidity level in the collecting vessel drops when the decomposition reaction is finished. Based on this observation, the electric motor 24 is equipped with a dehumidistat control 38 which automatically shuts off the motor as well as the electric heater when the reaction is complete and the moisture in the mixture drops below a predetermined level.

Figure 3:
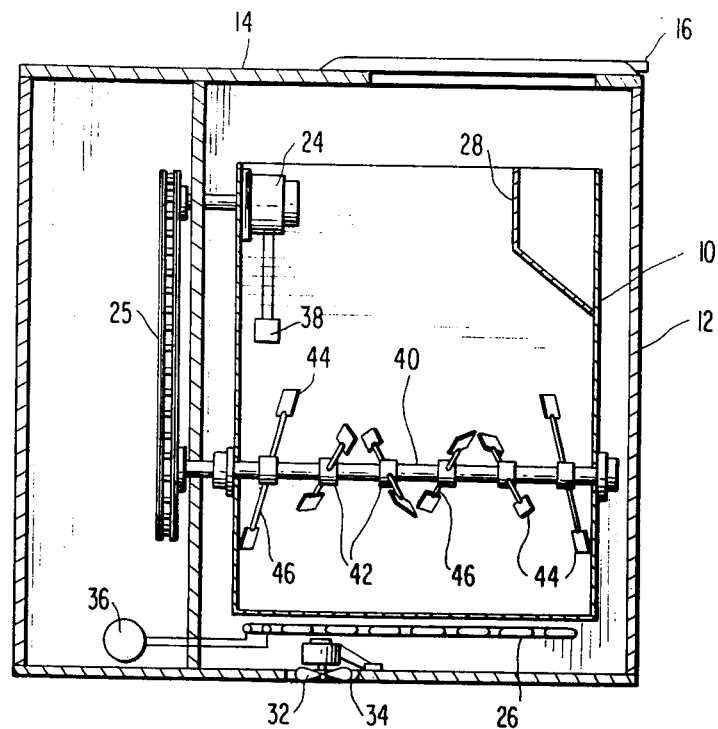
FIG. 3 is a side view of another preferred mixer which may be used in the invention.

FIG. 3 illustrates another stirrer which can be used in the present invention. This stirrer furnishes an auger-type mixing, i.e., a translational as well as a rotational mix of the matter within the collecting vessel and comprises a series of arms 46 equipped with paddles 44 journaled at 42 onto a horizontal shaft 40. As opposed to being perpendicular to the shaft as in U.S. Pat. No. 3,859,672, the arms 46 are journaled to the shaft 40 at an angle (in FIG. 3, about 15°-20° off of perpendicular) such that rotation of the shaft results in a rotational mix and translational movement of the matter to the center of the collecting vessel. The paddles sit on the arms at an angle to one another so that when viewed down the axis of the arms, the paddles cross. This assists in the translational movement of the matter.

Collecting vessel 10 includes a urinal chute 28. As pointed out above, rapid oxidation cannot take place if the composting mass is too wet. Thus, the liquid (urine) is either allowed to enter the mixing mass at a slow rate or evaporated by a separate heating coil in order to better control and percentage moisture in the decomposing mixture.

A main objective of the home unit bioconverter is to eliminate wastes without polluting the environment and, at the same time, conserve water and energy. In addition to body waste, an adult person generates large amounts of food and other organic wastes. These wastes can also be disposed of in my bioconverter. However, experience has shown that food wastes, such as grapefruit rinds and the like, must be shredded to be efficiently disposed of in this system. Thus, in the exemplary embodiment, a food shredder 48 is shown as an integral part of the unit.

Further, as pointed out above, an abundant supply of oxygen from the air is a fundamental requirement for efficient operation of the present system. An aerator may be located at the bottom of the collecting vessel. Such an aerator would be connected to a conventional source of compressed air such that upon using the bioconverter, air would be pumped directly into the composting mass to thereby further improve upon the contact achieved by thoroughly stirring and mixing the composting mass with the mixers. This feature, however, is optional and has not been found necessary in the units I have constructed.

Finally, is keeping with my objective to provide an energy efficient home unit, the heat carried from the collecting vessel in the decomposition gases and evaporated water can be conserved by incorporating a vapor condensing system (not shown) in with the vent system.

Food or human wastes may be put into the bioconverter in combination or separately. All of the bacteria required for the biological reactions are present in the wastes, and they proceed to react under all moisture conditions as discussed above. No special or additional bacterial cultures are required.

Having described this invention in detail, it will be apparent that numerous variations thereof are possible without departing from the scope of the following claims.

What is claimed is:

1. A method for aerobically convering organic waste material substantially completely into carbon dioxide and water comprising depositing said waste material into a substantially dry bed of a suitable dispersing agent located in a collecting vessel, initiating and continuously stirring the contents of said collecting vessel, sensing the humidity in said collecting vessel and stopping the stirring when the reaction is complete and the humidity drops below a predetermined level.

2. A method as set forth in claim 1, further comprising sensing the temperature within said vessel during said stirring of the contents of said vessel, supplying heat to said vessel during stirring to maintain a predetermined temperature and discontinuing the supply of heat upon stopping said stirring.

3. A method as set forth in claim 2, further comprising maintaining an optimum temperature of approximately 90° F. during said stirring.

* * * * *